(12) United States Patent
Previtali et al.

(10) Patent No.: US 12,141,980 B2
(45) Date of Patent: Nov. 12, 2024

(54) DEVICE AND METHOD FOR DETERMINING AND DISPLAYING NUTRIENT CONTENT AND/OR VALUE OF A FOOD ITEM

(71) Applicant: SNAQ AG, Winterthur (CH)

(72) Inventors: Nico Previtali, Zurich (CH); Lukas Frischknecht, Zurich (CH); Aurelian Briner, Winterthur (CH)

(73) Assignee: SNAQ AG, Winterthur (CH)

( * ) Notice: Subject to any disclaimer, the term of this patent is extended or adjusted under 35 U.S.C. 154(b) by 571 days.

(21) Appl. No.: 17/294,057

(22) PCT Filed: Nov. 13, 2019

(86) PCT No.: PCT/EP2019/081198
§ 371 (c)(1),
(2) Date: May 14, 2021

(87) PCT Pub. No.: WO2020/099498
PCT Pub. Date: May 22, 2020

(65) Prior Publication Data
US 2022/0028083 A1    Jan. 27, 2022

(30) Foreign Application Priority Data

Nov. 16, 2018   (CH) .................................. 01425/18

(51) Int. Cl.
*G06T 7/10*     (2017.01)
*G06N 3/02*     (2006.01)
(Continued)

(52) U.S. Cl.
CPC ................. *G06T 7/10* (2017.01); *G06N 3/02* (2013.01); *G06T 17/20* (2013.01); *G06V 20/653* (2022.01);
(Continued)

(58) Field of Classification Search
CPC ...... G06V 10/811; G06V 30/142; G06T 7/62; G06T 7/13; G06F 18/256; G01N 33/02
See application file for complete search history.

(56) References Cited

U.S. PATENT DOCUMENTS

| 6,533,120 B1 * | 3/2003 | Csengeri | ............. | B65D 5/5021 |
| | | | | 220/575 |
| 8,345,930 B2 * | 1/2013 | Tamrakar | ................ | G06T 7/593 |
| | | | | 382/110 |

(Continued)

OTHER PUBLICATIONS

Yi Ma et al., "An Invitation to 3-D Vision: From Images to Geometric Models" Interdisciplinary Applied Mathematics, No. 26 Springer-Verlag New York, LLC, 2004.
(Continued)

*Primary Examiner* — Yosef Kassa
(74) *Attorney, Agent, or Firm* — Collard & Roe, P.C.

(57) ABSTRACT

The present invention relates to a device, a method and a computer program product for displaying at least one quantitative and/or qualitative information on at least one nutrient content and/or value of a food item. At least one optical sensor is required for acquiring at least one image of the arrangement comprising a food item to be analyzed. Means for analyzing the image of the arrangement comprising the food items are also required and that means are adapted at providing a first segmentation of the at least one image and dividing the arrangement into a plurality of separately identifiable food items. Further that means is adapted at identifying at least one scale information of the at least one image and constructing a virtual model reflective of the arrangement comprising the food item. The means for analyzing the arrangement are further adapted at providing a second segmentation of the at least one image where in the second segmentation is for dividing the arrangement into one or more separately identifiable non-food items.

11 Claims, 3 Drawing Sheets

Figure 1:
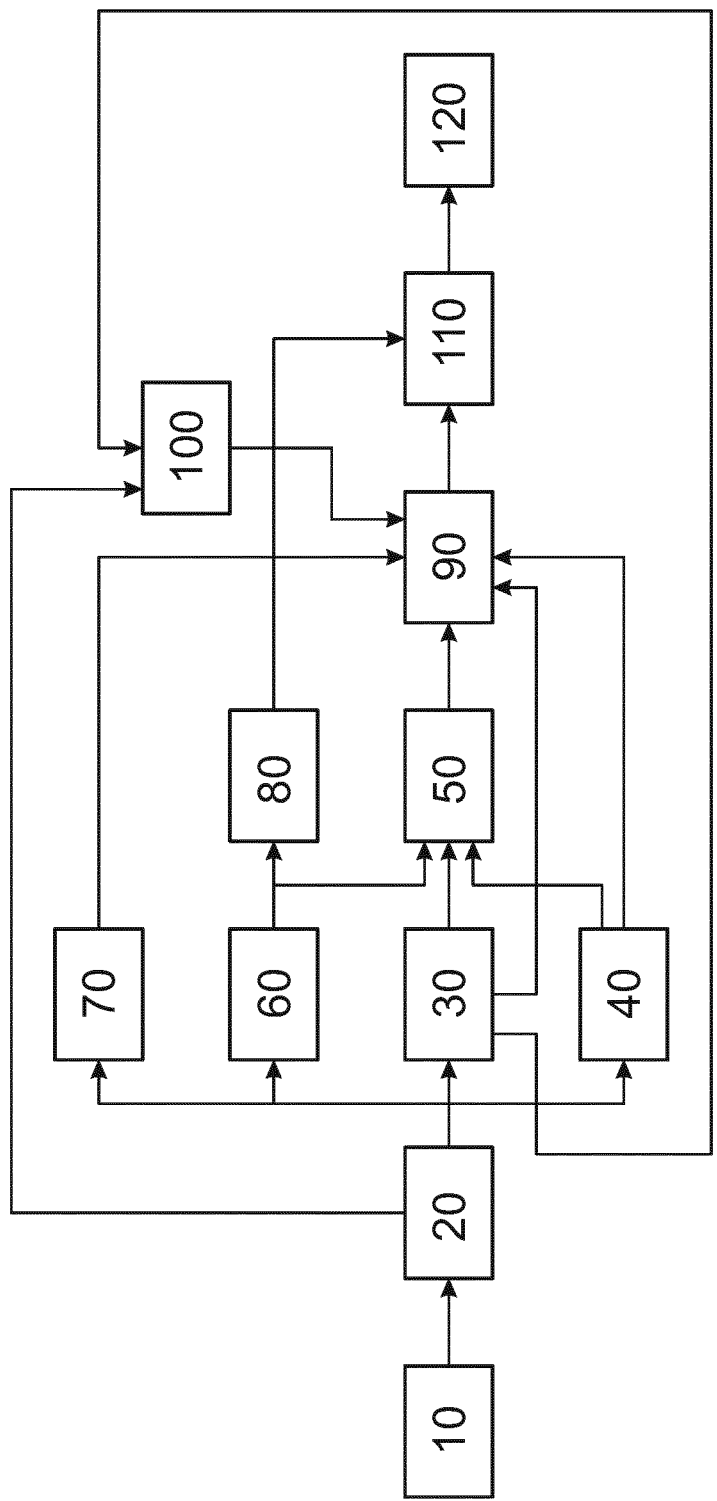

(51) Int. Cl.
   *G06T 17/20*    (2006.01)
   *G06V 20/64*    (2022.01)
   *G06V 20/68*    (2022.01)

(52) U.S. Cl.
   CPC .... *G06T 2207/30128* (2013.01); *G06V 20/68* (2022.01)

(56) References Cited

U.S. PATENT DOCUMENTS

| | | | | |
|---|---|---|---|---|
| 8,439,683 | B2* | 5/2013 | Puri | G09B 19/0092 |
| | | | | 434/127 |
| 9,254,099 | B2* | 2/2016 | Connor | G16H 20/60 |
| 9,442,100 | B2* | 9/2016 | Connor | A61B 5/681 |
| 9,529,385 | B2* | 12/2016 | Connor | A61B 5/1114 |
| 9,536,449 | B2* | 1/2017 | Connor | A61B 5/681 |
| 9,959,628 | B2* | 5/2018 | Mutti | G06V 10/811 |
| 10,314,492 | B2* | 6/2019 | Connor | A61B 5/681 |
| 10,402,981 | B2* | 9/2019 | Patel | G06T 7/162 |
| 10,900,943 | B2* | 1/2021 | Fernstrom | G01N 21/00 |

OTHER PUBLICATIONS

International Search Report in PCT/EP2019/081198, mailed Feb. 27, 2020.

Toshiyo Tamura: "Seamless Healthcare Monitoring Advancements in Wearable Attachable and Invisible Devices" In: "Seamless Healthcare Monitoring Advancements in Wearable Attachable and Invisible Devices", Jan. 1, 2018 (Jan. 1, 2018), Springer, XP055669835, pp. 402-404.

Dehais Joachim et al: "Two-View 3D Reconstruction for Food Volume Estimation", IEEE Transactions on Multimedia, IEEE Service Center, Piscataway, NJ, US, vol. 19, No. 5, May 1, 2017 (May 1, 2017), pp. 1090-1099, XP011646837.

Dehais Joachim et al: "Dish Detection and Segmentation for Dietary Assessment on Smartphones", Aug. 21, 2015 (Aug. 21, 2015), Robocup 2008: Robot Soccer World Cup XII; [Lecture Notes in Computer Science; Lect.Notes Computer], Springer International Publishing, Cham, pp. 433-440, XP047516825.

Dehais J. et al. "Two-view 3D Reconstruction for Food Volume Estimation", IEEE Transactions on Multimedia; pp (99): 1-1; Dec. 2016.

Rother, C.V. et al., "Grabcut: Interactive Foreground Extraction using Iterated Graph Cuts", ACM Trans. Graph., vol. 23, p. 309-314, 2004.

Graham, R.L., "An Efficient Algorithm for Determining the Convex Hull of a Finite Planar Set" Information Processing Letters, 1:132-133, 1972.

Ramer, U., "An iterative procedure for the polygonal approximation of plane curves", Computer Graphics and Image Processing, 1(3), 244-256, 1972.

* cited by examiner

DEVICE AND METHOD FOR DETERMINING AND DISPLAYING NUTRIENT CONTENT AND/OR VALUE OF A FOOD ITEM

CROSS REFERENCE TO RELATED APPLICATIONS

This application is the National Stage of PCT/EP2019/081198 filed on Nov. 13, 2019, which claims priority under 35 U.S.C. § 119 of Swiss Application No. 01425/18 filed on Nov. 16, 2018, the disclosure of which is incorporated by reference. The international application under PCT article 21(2) was published in English.

The present invention relates to the field of devices with an output for displaying at least one quantitative and/or qualitative information on at least one nutrient content and/or value of a food item.

The present invention further relates to a method of operating such a device, as well as a computer program product that, when operated on a device with an output as described is adapted at executing the said method, all according to the preambles of the independent claims.

TECHNOLOGICAL BACKGROUND

It has become a common standard to provide packaged and ready-made food items in stores and retail with nutrient information on the packages. This information does not only serve at supporting the consumer at making nutritious choices for themselves and their families, but as well at providing critical information for persons that want, or have, to follow a particular diet regime.

The most common information printed on labels is the energy of a food item, which most often is expressed in form of calories and displayed in a per serving amount. Certain diseases and conditions require patients to observe certain dietary rules for alleviating or minimizing the symptoms. A common metabolic disorder whose symptoms can be alleviated by observing a particular diet regime is diabetes mellitus. Diabetes mellitus is a condition with a disturbed insulin secretion and requires increased awareness for food, glucose levels and the glycemic index of food items. For diabetes, one of the most common recommendations to patients is to achieve glycemic control by monitoring blood sugar and take appropriate measures to help with its regulation. Increased blood sugar is controlled by injections of appropriate diabetes drugs and an adequate meal planning is required to prevent blood sugar from peaking after meals. Carbohydrates, such as starch and sugar are the most important drivers for blood sugar peaks after meals. People suffering from diabetes are trained in estimating the amount of carbohydrates in meals and determining the required amount of insulin. Still, there is a significant deviation in the estimated effects on blood sugar values of certain meals compared to the real effects. A wrong estimation can lead to blood sugar levels that might, if regularly below or above thresholds, lead to the occurrence of diabetes associated symptoms hyperglycemia and hypoglycemia, which can cause diabetes related complications like damage to large and small blood vessels, increased risk of heart attack and stroke, problems with the kidneys, eyes, feet and nerves. Particularly inexperienced patients have difficulties in estimating the amount and weight of food items to determine the required injection amount of insulin. To this end, scales are available with which patients can weigh food items to better estimate their respective glycemic index.

Furthermore, there might be a need to identify more than just the energy content, such as for instance micro- and/or macronutrient content. One further metabolic condition that requires patients to adhere to a particular diet is phenylketonuria, for which imiting the intake of certain amino acids can alleviate the symptoms considerably.

Dehais, J. et al. (Two-view 3D Reconstruction for Food Volume Estimation; IEEE Transactions on Multimedia; pp (99):1-1; December 2016) propose a computer assisted visual recognition of a food portion estimation. The proposed method has a three-stage system to calculate portion sizes using two images of a dish acquired by a normal camera of a smartphone mobile device. The first stage requires understanding the configuration of the different views. Afterwards a dense three-dimensional model is built from the two images and finally, the volume is extracted by means of this three-dimensional model. The system uses a reference card for estimating the size of the food item captured by means of the camera. The volume estimation is performed by extracting the food surface and the dish surface, whereas the latter is made difficult by glazed or plastic or ceramic and reflective surface of the dishes. Dehais' circumvents this problem partially by using again the reference card to estimate a distance of the dish rim in regard to the reference card, and statistically determining the most representative plane by means of a RANSAC algorithm. The system only works with a limited predetermined set of non-food items used as dishes or bowls and is highly dependent on extrinsic calibration of the recognition model. Furthermore, the system is dependent on using a two-image capturing for determining the food volume.

There are over 50 million diabetics who depend on bolus-insulin injections before each meal. For that, the patient needs to estimate the carbohydrates content of the meal in order to determine the correct amount of insulin. When the estimation errors are too high the patient will feel dizzy a few hours after the meal or drink. This estimation is performed by eye or by putting each item on a scale and looking up nutrition facts in a table.

Therefore there is a need in the art to provide a method and a device for displaying at least one quantitative and/or qualitative information on at least one nutrient content and/or value of a food item that is more flexible and can be implemented in a variety of devices, while at the same time providing an adequate precision in the estimation of the food items captured.

SUMMARY OF THE INVENTION

It is an object of the present invention to provide a device with an output for displaying at least one quantitative and/or qualitative information on at least one nutrient content and/or value of a food item that overcomes at least one disadvantage of the prior art.

It is a particular object of the present invention to provide such a device that is easy to use and easily available.

One particular object of the present invention is providing a device as previously described, that can be used to automatically synchronize with an insulin pump or to put the nutritional data in context with glucose readings from glucose monitoring devices.

This has been solved with a device, a method and a computer program product according to the characterizing impulsions of the independent claims.

One aspect of the present invention is a device with an output for displaying at least one quantitative and/or qualitative information on at least one nutrient content and/or value of a food item.

In a particular embodiment, the output can, be a display, but eventually additive or tactile output is also within the scope of this aspect, as long as it is capable of providing at least one quantitative and/or qualitative information on the nutrient content as described. In a most preferred embodiment, the output is a screen capable of displaying figures and/or numerical values comprising quantitative and/or qualitative information on the at least one nutrient content and/or value of the food item. The output can be the screen of a smartphone for instance.

The device of the present invention has at least one optical sensor for acquiring at least one image of an arrangement comprising a food item.

In a particular embodiment of the present invention, the optical sensor is an image capturing device, such as a camera sensor capable of capturing a RGB image.

In a particular embodiment, the optical sensor is a range imaging device capable of acquiring an image of an arrangement comprising a food item together with information relating to the distance of the points captured in the image from a specific point.

The device of the present invention further comprises means for analyzing the image of the arrangement comprising a food item. That means for analyzing is adapted at providing a first segmentation of the at least one image for dividing the arrangement into a plurality of separately identifiable food items.

In the context of the present invention, a segmentation can be understood as a process of partitioning an image into a subset of the image consisting of sets of pixels, for instance. Image segmentation is a common practice in the field of processing two and three-dimensional objects.

That means for analyzing is further adapted at identifying at least one scale information of the at least one image.

In a particular embodiment, the scale information can be an element present on the image of an arrangement comprising the food item. In a particularly preferred embodiment the scale information is present in the image of the food item itself, for instance as an intrinsic value of the said image obtainable from the depth map of a dual camera system. In an alternative or additional embodiment, the scale information is a physical object placed in the proximity of the arrangement comprising a food item before the image is taken, such that the physical object appears on the image of an arrangement comprising the food item. In an even more particular embodiment, this physical object provides scale information, such as, e.g., a standardized size code that enables the device of the present invention to identify at least one scale information of the image.

The device of the present invention is further equipped with a means for analyzing that is adapted at constructing a virtual model reflective of the arrangement comprising the said food item.

In a particular embodiment of the present invention, the means for analyzing is adapted such, that the constructing of the virtual model comprises the deprojection of the two-dimensional image of the arrangement comprising the food item into a three-dimensional model by means of deprojecting the image pixels.

In the context of the present invention, a virtual model reflective of the arrangement comprising the food item can, for instance, be understood as a model that in size information and shape essentially corresponds to the physical object that is captured by the optical sensor as an arrangement comprising the food item.

The arrangement comprising the food item as understood in the context of the present invention shall be understood as an arrangement of a meal on a serving platform. The serving platform can, for instance, be a table on which one or more dishes, bowls and/or glasses are positioned along with cutlery and further items relating to the place setting. The arrangement shall be understood as comprising at least one edible subject which qualifies as a food item. For the sake of the present invention, the food item shall not be restricted to solid food but can comprise liquids in all states of viscosity. The food item can be understood as a lot of individual food items, such as a certain amount of pasta or beans. Such an amount of food items can be qualified as one food item for the sake of the present invention. The arrangement can of course comprise a plurality of food items of a different kind.

The device of the present invention is further equipped with means for analyzing the arrangement that is adapted at providing a second segmentation of the at least one image. This second segmentation is adapted for dividing the arrangement into one or more separately identifiable non-food items.

In a context of the present invention, the non-food items can be defined as described above in respect to the arrangement comprising a food item as all elements on the respective image that belong to the cover and are not edible.

In a most preferred embodiment, though, the non-food items shall be understood as the carriers and containers on which the food items are arranged, such as bowls, dishes, cups, glasses and/or platters, etc. for instance.

In a particular embodiment of the present invention the device comprises at least two optical sensors for acquiring at least two images of the arrangement comprising a food item.

In a particularly preferred embodiment, the two images are acquired simultaneously and are images of the arrangement comprising a food item taken at different angles. For the context of the present invention even a slight difference in the angles the images are so taken qualifies for the purpose of this embodiment.

In a further particular embodiment of the present invention, the optical sensor is adapted at taking a rapid sequence of images with each image constituting a frame. In this particular embodiment the acquiring at least one image of an arrangement comprising a food item can, e.g., be performed by moving the device with the optical sensor along a path with the optical sensor facing the arrangement comprising the food item, such that a plurality of frames is captured, each at a slightly different angle, of the arrangement comprising a food item.

In a particularly preferred embodiment of this example, the movement is performed along a predetermined path and the device comprises a guidance means for instructing the operator on how to perform this movement along a predetermined path.

In a particular embodiment of the present invention, the device comprises further sensors capable of detecting a force resulting from a movement of the device. This can be, in its most basic implementation, an accelerometer and/or a gyroscope adapted at measuring acceleration in at least three axes.

In a particularly preferred embodiment, further sensors can be implemented into the device, such as a magnetometer, e.g. These further sensors can be adapted, such as to automatically register an angle and/or a movement of the device respective to the arrangement comprising a food item from which an image is captured. In a particularly preferred embodiment, the sensors are adapted at capturing a depth map of the arrangement comprising a food item, so that the distance in absolute units between the sensor and the points on the image is recorded.

In a particularly preferred embodiment, these further sensors can aid in the guidance of the operator for performing a predetermined movement as described by way of example in the particular example further above.

Such sensors are commonly known in the art and appropriate inertial measurement sensors are regularly implemented in smartphone devices and adapted at detecting force, orientation, localization and sometimes even magnetic field.

In a particular embodiment, the device of the present invention comprises a time-of-flight camera as an optical sensor. In the context of the present invention a time-of-flight camera can be understood as a camera capable of measuring the time of flight of a light signal emitting from the device between the point of emittance and each individual point of the image.

In a particularly preferred embodiment, the time-of-flight camera is a laser-based time-of-flight camera.

In a particular embodiment of the present invention, the means for analyzing the arrangement is adapted at deprojecting at least one image of an arrangement comprising a food item into a three-dimensional point-cloud for constructing a virtual model reflective of the arrangement comprising a food item. Various models for deprojecting a two-dimensional image are known in the art and the skilled artisan is capable of selecting the appropriate method depending on the further hardware and software characteristics of the device implemented according to the present invention. In a most preferred embodiment, a point-cloud is generated by deprojection of a predicted depth map, whose prediction was generated by instructing a neural network with images obtained from a camera with intrinsic features that are adapted at providing a depth map for the images.

In a particular embodiment of the present invention, the means for analyzing the arrangement is adapted at corresponding a first point of at least one first image of an arrangement comprising a food item with one second point of at least one second image of an arrangement comprising a food item. The first image of the arrangement comprising a food item and the second image of the arrangement comprising a food item are both of the same arrangement and preferably taken at different angles. This can be done for constructing the virtual model of the arrangement comprising a food item.

In a particular embodiment of the present invention, the device comprises a connection unit for establishing a data connection. This connection unit can be in the form of a chip capable of interacting with a wireless communication protocol, such as Bluetooth, Wi-Fi and/or satellite navigation.

In a particular embodiment of the present invention, the means for analyzing the arrangement comprise a connection with a neural network, said neural network being adapted for providing a first segmentation of the at least one image for the dividing the arrangement into a plurality of separately identifiable food items. In a particularly preferred embodiment, the connection is established by means of the connection unit for establishing a data connection.

Particularly preferred, the neural network is trained for identifying food and drink items and has access to a respective database with data relating to food and drink item. In the context of the present invention the neural network shall be understood as an artificial neural network adapted at processing data using statistical techniques as commonly understood under the term of "Machine learning", e.g.

In a particular embodiment the database comprises information mapping nutritional information to volume information. In a further particular embodiment, the database also comprises information on the density of particular food items.

A particular advantage of using a neural network is that the neural network gets better at the performed tasks with each performed analysis when feedback is available.

In a particular embodiment of the present invention, the means for analyzing the arrangement comprises a connection with the neural network for providing the second segmentation of the at least one image for the dividing the arrangement into one or more separately identifiable non-food items.

In a particular embodiment of the present invention, the means for analyzing the arrangement comprises a connection with a neural network for providing the identifying at least one scale information of the at least one image. Alternatively, a reference object may be used that when placed or identified within the image of the arrangement comprising a food item is identified and scale information is derivable therefrom as already described previously. Further alternatively a dual camera system may be used with at least two cameras, where the relative position and angle of the at least two cameras is known, and a depth map can be obtained by reference between the two cameras. In this embodiment, the depth map comprises scale information and consecutively, a point-cloud resulting therefrom comprises scale information, in particular absolute size information.

In a particular embodiment of the present invention, the means for analyzing the arrangement is adapted at providing a shape identification of the one or more separately identifiable non-food items. Means adapted at providing either a first and/or a second segmentation can be implemented such as to incorporate a processor capable of performing a method adapted at image segmentation. One applicable example method is a segmentation method based on graph cuts. In a first step a bounding box is defined around the object to be segmented and an algorithmic estimation of a color distribution of the target object and the background is performed by application of an appropriate and well-known mathematical method. A random field is then constructed over the pixels of the image and the said graph cut based optimization for inferring the values is then performed. Suitable protocols are available on an open source basis, such as OpenCV (Open Source Computer Vision). Advantageously these protocols also support machine learning protocols. The implementation of the most suitable protocol is left to the artisans' discretion and dependent on the hardware specifications and capabilities of the device used.

With the device according to the present invention, a device for displaying at least one quantitative and/or qualitative information on at least one nutrient content and/or value of a food item is provided that is reliable, efficient and versatile in how it can be implemented in an end-user device. One particular implementation can be a particularly adapted smartphone implementation. This has the further advantage, that most currently available smartphones comprise a plurality of sensors, amongst which at least one optical sensor suitable for the device according to the present invention. The device can also be implemented into a separate unit, such as a medical device usable by patients suffering from diabetes mellitus. This device can be equipped with further elements that enable the patient to manage the disease by following a diet regime and synchronizing the diet regime with the administration of the respective drugs. This device can be in direct or indirect (by means of an external server connection, e.g.) communication with a wearable, self-contained insulin dispensing device with an automatic syringe and insulin pump. By increasing the reliability of the estimation of glycemic index of meals such a combination provides the patient with better management of blood glucose levels and can be helpful to reduce many of the short- and long-term symptoms of hyperglycemia or hypoglycemia.

A further aspect of the present invention is a method of operating a device with an output for displaying at least one quantitative and/or qualitative information on at least one nutrient content and/or value of a food item. Preferably the method of operating a device is a method of operating a previously described device.

The method comprises the steps of acquiring at least one image of an arrangement comprising a food item. The method comprises a further step of providing a first segmentation of the at least one image for dividing the arrangement into a plurality of separately identifiable food items. A suitable method for segmenting an image has been described above. A further step is the identifying of at least one information for scaling the virtual model of the arrangement comprising the food item in respect to its real-world scale.

In a context of the present invention, a scaling can be understood as generating information relating to a pixel to millimeters ratio, e.g. Essentially, the scaling needs to provide information that are as close as possible to the real-world dimensions of the arrangement comprising at least one food item, in particular relating to the size of the food items themselves.

In a particular example, where the device used for implementing the present method is capable of generating a depth map, the information relevant for the scaling of the image is already intrinsic in the image.

The method of the present invention further comprises the step of constructing a virtual model reflective of the arrangement comprising the food item. The method also comprises the step of providing a second segmentation of the at least one image for dividing the arrangement into one or more identifiable non-food items.

With the method of the present invention it becomes possible, to implement a food recognition and estimation means into a plurality of suitable devices. The method has the advantage of not only being accurate in the estimation of the food volume, but also on being able to clearly and precisely distinguish and delimit the food volume from the volume of non-food items, such as cups, dishes, platters, cups, glasses and/or bowls, etc.

In a particular embodiment of the present invention, the method comprises the step of calculating a volume of each separately identifiable food item, calculating a volume of each one or more identifiable non-food items and providing at least one quantitative and/or qualitative information on at least one nutrient content and/or value of the food items. For the context of the present invention the scope and nature of the qualitative and/or quantitative information provided is subject to the specific requirements of the intended application. The information can be a basic calorie value of a food item. Alternatively or additionally the information might comprise further data retrievable from databases and calculated from the image of the arrangement as performed by the inventive method, such as vitamin content, mineral content, allergen content, protein content, fat content, carbohydrate content and/or nutritional additive content. Qualitative information can comprise information such as "Healthy", "Unhealthy", etc. Qualitative Information can also comprise warnings with respect to the detection of particular allergens.

In a particularly preferred embodiment, the method of the present invention has access to a database with personalized information of the user. This information can comprise basic medical or clinical information, such as blood glucose levels that are measured and inputted into the database either automatically or manually by the patient, or more lifestyle-oriented information, such as diet goals for reducing weight etc. Qualitative information displayed by the method of the present invention can be based on machine learning algorithms learning from past meals of the patient and deriving preferences and/or aversions of the user based on feedback provided on once scanned arrangement comprising at least one food item.

In a particular embodiment of the present invention, the method comprises prompting an interface after a certain time has lapsed from providing at least one quantitative and/or qualitative information on at least one nutrient content and/or value of a food item. This prompt interface can be devised such, that a machine learning algorithm uses the answers provided by the patient/user to improve a database searchable with respective algorithms for performing the steps of segmenting, identifying and/or calculating a volume of separately identifiable food items and/or a volume of separately identifiable non-food items. In a further particular embodiment, the method comprises prompting an interface requesting the patient/user to provide feedback on at least one of a result from the segmentation, identification, volume and nutrition fact of a particular food items. Prompting interfaces have the advantage, that the nutrition facts database is improved, as the device is being used, resulting in a neural network being able to work with increasingly stable and reliable data.

In a particular embodiment of the present invention, the step of constructing a virtual model comprises the generation of a three-dimensional model from the two-dimensional image of the arrangement comprising a food item. This can in particular comprise the step of deprojecting a two-dimensional image.

In a particular embodiment of the method according to the present invention, the acquiring at least one image of an arrangement comprising a food item comprises acquiring at least two images of the arrangement comprising the food item, whereby these two images are preferably acquired from two different angles.

In a particular embodiment of the method according to the present invention, the first segmentation and/or the second segmentation comprises a step of inputting at least one RGB or RGB-D image or a combination of RGB and RGB-D images to a segmentation unit aided by a neural network and further comprises receiving a segmentation mask with corresponding bounding boxes. For the variant of this embodiment comprising RGB-D images it is preferable, that device is equipped with a depth camera and the means for analyzing the image be adapted to augment the image with depth information derivable from the distance of the optical sensor and the actual arrangement comprising the at least one food item on a per-pixel basis.

In a particular embodiment of the present invention in a first step of the second segmentation a container shape is identified. Preferably a container shape is identified from a group of predetermined container shapes consisting of: rectangular container shape, triangular container shape, circular container shape and oval container shape.

Even more preferably the container shape is identified by means of the segmentation mask received from the inputting at least one RGB and/or RGB-D image to a segmentation unit.

In this embodiment, a container diameter is afterwards determined. The container diameter is preferably determined by means of derivation from the segmentation mask with corresponding bounding boxes. Preferably the bounding boxes are selected according to the previously identified container shape.

One further aspect of the present invention is a computer program product, that when operated on a device with an output for displaying at least one quantitative and/or qualitative information on at least one nutrient content and/or value for food item is adapted at executing the method according to the previously described aspect of a method.

Preferably this computer program product is executed on a device as initially described.

By means of the present invention, a flexible method for displaying quantitative and qualitative values relating to nutrients of a food item is provided that is capable of providing a reliable estimate of the said nutrients based on an optical identification of the food items and a clear distinction of the food items from the non-food items.

For a skilled artisan it is evident from the studying of the teaching of the present invention, that all the particular embodiments can be implemented in an implementation according to the present invention in any combination that is not mutually exclusive.

In the following chapter the present invention is further outlined by means of a particular examples and figures, without being limited thereto. The skilled artisan might derive further advantageous embodiments from the study of these description, though.

The following figures are schematic representations of particular aspects and processes implemented according, to the present invention and the same parts have been indicated with the same reference numbers in the different figures for the sake of simplicity.

FIGURES

Figure 2A:
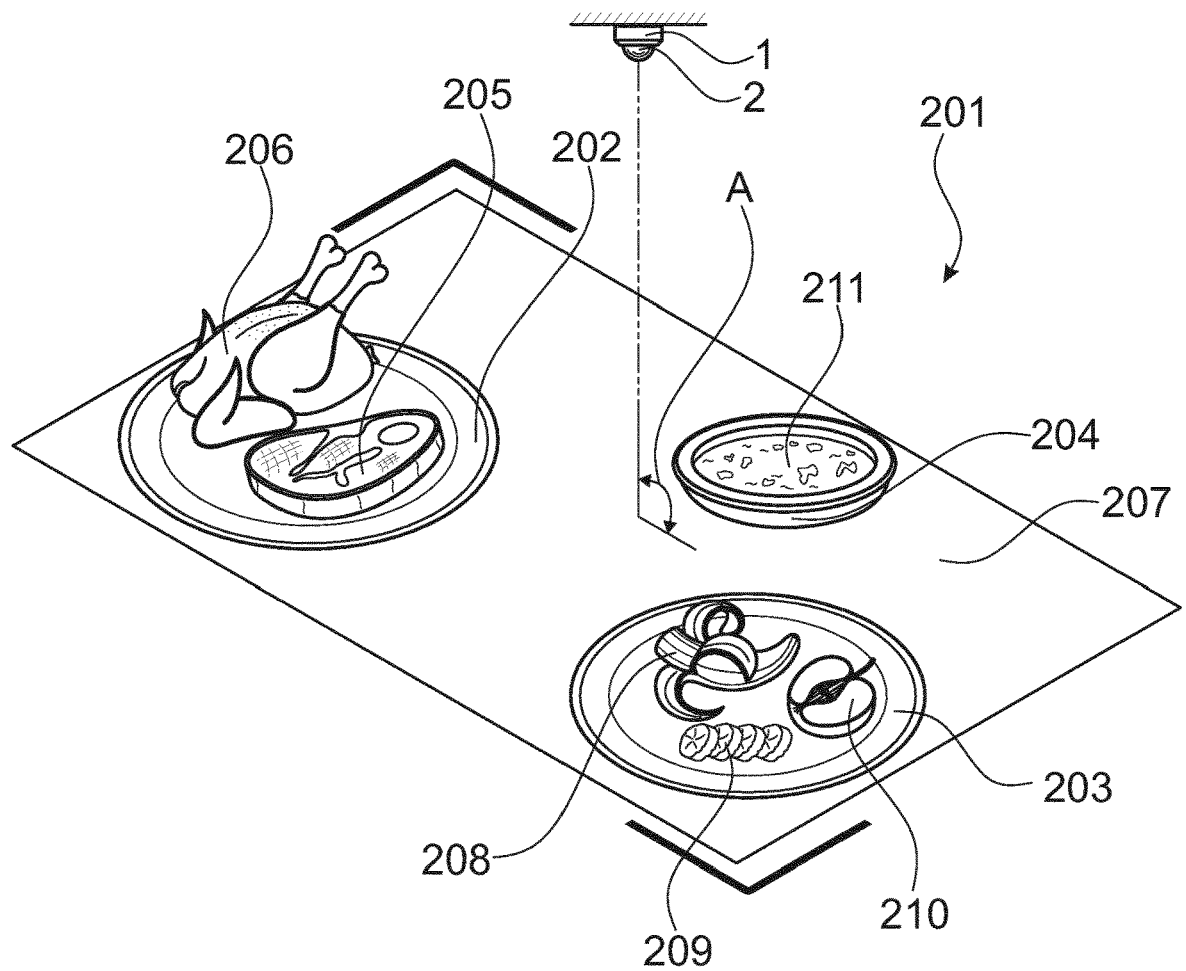
Figure 2B:
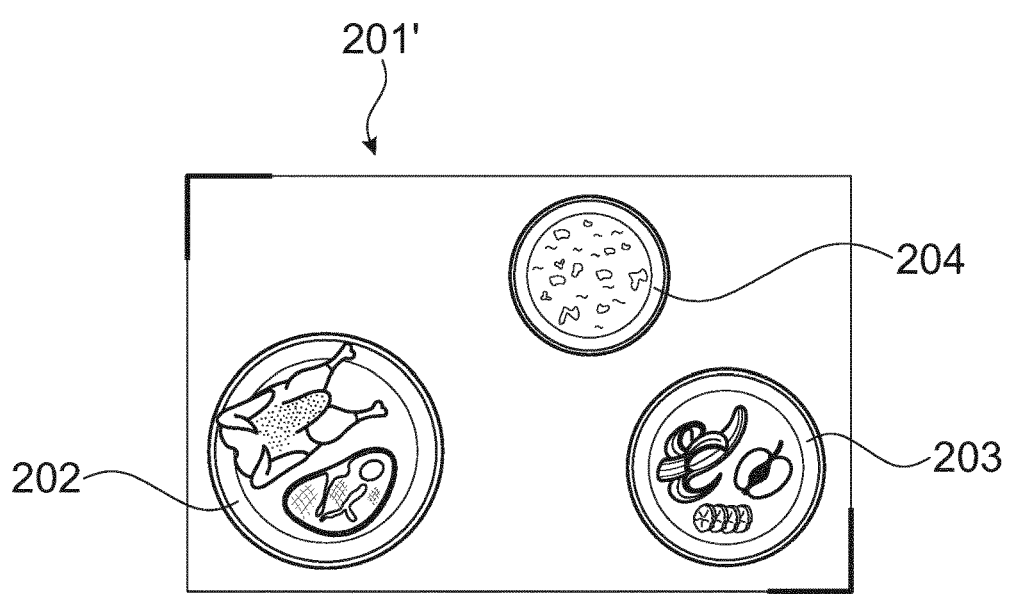
Figure 3:
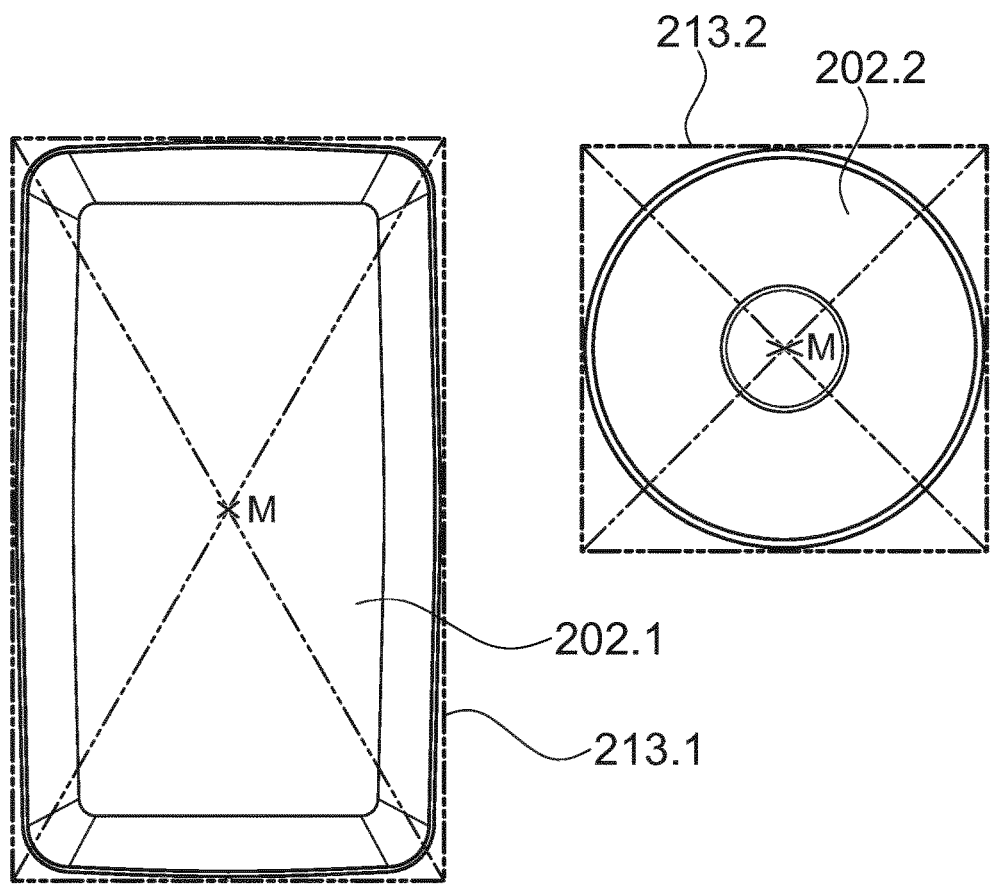

The figures show schematically:

FIG. 1: a schematic representation of the main processing steps of an implementation of a particular example of the present invention;

FIG. 2a: an arrangement with a food item;

FIG. 2b: an image of an arrangement comprising at least one food item;

FIG. 3: a model of the cross-section calculation for a non-food item, and

Figure 4:
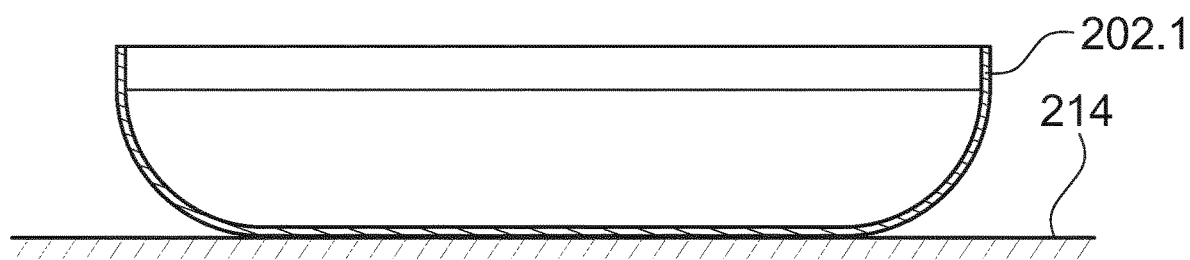

FIG. 4: a mapping of a container shape on the ground plane.

DETAILED DESCRIPTION

FIG. 1 shows a possible implementation of the present invention on a device by illustrating some of its main processing steps. This implementation is a working by way of example, and not all the process steps might be required depending on the hardware possibilities of the optical sensor and the device used. In particular the availability of depth information/a depth map by an optical sensor, or any further aiding sensors can enable a bypass of some of the steps.

The first step is a pure data acquisition step by capturing of an image and acquiring at least one image 10 of an arrangement comprising a food item. Following the acquiring at least one image 10, a data preparation step 20 is performed for preprocessing the data. This step can be used, e.g., to eliminate distortion or to align depth maps depending on the input data. In a particular example, if a physical location of a depth map acquisition component is different from the physical location of an image acquisition component, such as an optical sensor, a mathematical transformation is applied to align the depth maps to the RGB images, such that the same pixel in both images overlap and are accessible by the same pixel coordinates. Another example of a data preparation step 20 would be performed in case of a lens distortion introduced by the optical sensor or the depth sensors and appropriate undistortion methods can be applied before the image is processed further.

The preprocessed data is further processed such that a first segmentation is provided 60, where all the food and drink items are segmented. Various methods exist to detect and segment food and drink items visible in an image.

In the present example a specially trained neural network that has been trained on labeled food and drink images is used to detect and segment food and drink items. This can be done directly on RGB or RGB-D images inputted into a segmentation unit.

Resulting are food and drink segmentation masks with corresponding bounding boxes. This step can include further refining steps, such as selecting from a multitude of available RGB images the one, with which the food items can be best segmented, in particular an image with which the camera was most close to a perpendicular orientation respective to the plane where the arrangement comprising at least one food item is placed. As a fallback, in case an automated segmentation fails or is not available at an adequate accuracy for instance, a manual correction can be prompted to the user or a particular error code can be output, such that a user can intervene and manually adapt the segmentation on a screen display. This can be done by manually drawing a line around an object to be segmented on an image displayed on a screen. The computer program can be adapted to mark the enclosed area as possible foreground and everything outside the area as background. A segmentation mask is than constructed for which in the present example the Grabcut algorithm is utilized (Rother, C. V., et al., Grabcut: Interactive Foreground Extraction using Iterated Graph Cuts, ACM Trans. Graph., vol. 23, p. 309-314, 2004).

Depending on whether one camera was used, or a plurality of images was made available a different process for generating a three-dimensional model 40 is used. When only a single image has been recorded, dependent on whether a depth information is available, a deprojection of the two-dimensional image pixels into a three-dimensional point-cloud is performed by using a known camera intrinsic parameter of the depth camera and the recorded depth map. If only a single RGB image has been acquired, a corresponding depth map can be predicted using a machine learning algorithm to generate a three-dimensional point-cloud. In this example, the system can use the intrinsic capabilities of the depth sensor used to record the training data for the neural network. When a multitude of images is available, or even a video with a multitude of frames is available, a three-dimensional point-cloud is used for the case where depth maps are available, by using the estimates of the camera positions for all recorded image by means of a structure from motion technique. Structure for motion is a photogrammetric range imaging technique for estimating three-dimensional structures from two-dimensional image sequences by means of using motion signal (Yi Ma, et at, An Invitation to 3-D Vision: From Images to Geometric Models; Interdisciplinary Applied Mathematics, No. 26. Springer-Verlag New York, LLC. ISBN 0-387-00893-4, 2003). The estimated camera poses, camera intrinsic parameters of the depth sensor and the recorded depth maps and RGB image are used in an algorithm for fusing the input data with into a three-dimensional point-cloud.

In the case no depth map is available, multi-view stereo can be used to generate a three-dimensional point-cloud out of a scene comprising a multitude of frames with RGB images. Combining the multi video stereo with the structure from motion technique provides a plurality of frames at particular positions of the camera from which camera poses can be estimated and a three-dimensional point-cloud reconstructed.

As the process steps of generating a three-dimensional point-cloud 40 and the segmentation of the food items 60 and a segmentation of all non-food items 30, as well as a scaling 70 are performed preferably in parallel and synchronously, the segmentation 30, 60 can be supported with data calculated from the generation of the three-dimensional model 40.

In the example generating a three-dimensional point-cloud 40, where multiple images or a video have been recorded an octree of the three-dimensional point-cloud is built with a resolution of the octree of 0.8 mm. The previously estimated camera poses and estimated intrinsic parameters of the segmented RGB image are deprotected pixel by pixel in the segmentation mask into an image plane of the camera and a ray is calculated from the estimated camera position to the deprojected image plane position. By means of the octree, a ray casting of the ray is performed such that all the voxels in the octree intersect with a ray. Therefrom a segmented three-dimensional point-cloud with points corresponding to the pixels of the segmentation mask in the RGB image is obtained by mapping the matched octree voxels back to the three-dimensional point-cloud points.

In an alternative, where only a single image has been recorded, the pixel coordinates are accessed and a three-dimensional point-cloud with points corresponding to the pixels of the segmentation mask in the RGB image is obtained.

The segmenting of the non-food items 30 follows the same principles and can be subject to the same variants as the segmenting of the food-items 60. A neural network trained for identifying food and drink containers detects and segments every container. The input as above is an RGB or an RGB-D image and a segmentation mask with corresponding bounding boxes are output for each separately identifiable food and/or drink containers, respectively non-food items. As described above, a manual segmentation can be performed in case the system decides that the available data does not allow for a reliable estimate of the non-food items segmentation.

Once the segmentation of the non-food items is accomplished, a ground plane can be determined 50 by removing all points associated with food items and non-food items in the three-dimensional model. The points have already been identified by the process steps 30 and 60. Afterwards an iterative method can be applied, in the particular example a RANSAC algorithm, to eliminate outliers of all the points which are below or above the plane remaining. This provides a definition for a ground plane. A preprocessing step can be implemented before the RANSAC is run, in order to have a faster and more robust convergence of the RANSAC Algorithm. In this particular example, a three-dimensional Principal Component Analysis (PCA) of the remaining set of points is performed. The third principal component is an estimate of the normal plane. Therefrom resulting normal vector is used to iteratively plot a plane, where in each iteration, the number of points within a certain perpendicular distance from the normal plane are counted and stored in a histogram. Afterwards, the peak of this histogram is identified, and its corresponding plane support point is retrieved. Finally, only the points within a certain perpendicular distance from the plane described by the estimated normal vector found via PCA and the support point found via the previous step, are fed to the RANSAC Algorithm.

As stated above, in parallel to the segmenting 30, 60 and the generation of a three-dimensional model 40 the real-world scale is determined 70. This information is used for computing the volumes in standard units, such as cubic centimeters or milliliters of the food-items and non-food items analyzed. Variable methods can be applied for determining the real-world scale of the item on the image of the arrangement comprising at least one food item. The choice of method is dependent on the hardware possibilities of the device into which the method is incorporated for operating and providing an output for displaying at least one quantitative and/or qualitative information on at least one nutrient content value of a food item to be analyzed.

When the image acquisition component, i.e., the optical sensor supports a generation of depth maps, there is no need to separately determine a real-world scale, since the depth maps are already decoded in absolute standard units. Thus, this step would in that particular example be already covered by the generation of the three-dimensional model 40 as described further above.

In a particular circumstance, where a dual cam is available, but is not calibrated as it comes from the supplier, a prior calibration can be performed to set the base line between the two cameras.

In any case, where a depth map is not provided or not encoded with scale information, such as code defining absolute distances, two applicable alternatives shall be described with which the present example can be implemented.

In a first case, an object with a known size is detected in the image. A machine learning-based algorithm can be adapted to search specifically for such objects and segment them. This can be archived, e.g., by a particularly coded scale object easily recognizable by optical recognition means that comprises a predetermined true scale information which then an algorithm is capable at apply over the hole of the image comprising the arrangement with at least one food item.

In the case no such reference object is used or detected, it is still possible for a machine learning-based model to predict the scale of the food items and non-food items on the arrangement. A possible procedure to archive that would be selecting an image out of all recorded images, predict a corresponding depth map containing information in standard units, e.g., in millimeters, selecting two points on the ground plane as determined above and calculating the distance in standard units.

In a most specific example, this can be performed by selecting two points in the ground plane. Projecting these two points into the image plane using the estimated camera poses and estimated camera intrinsics as described above, and calculating the distances between the projected points on the image plane and camera center in the three-dimensional space. Then the angles between the two distance lines of the two points are calculated. From the depth map the distance from each other points to the camera center is derived. With this information the distance between the two points can be calculated by use of simple trigonometry.

The preprocessed data is also supplied directly into a container shape identification step. Once the container shape has been estimate identified a cross section by approximation of a polygon can be estimated from which its three-dimensional properties can be inferred, such as height, depth, etc. This allows for an accurate volume estimation of any food and/or drink items within the container. In the particular example, for the sake of simplicity a symmetric container form is assumed respective to the center of the container and a bounding box axis of the container shape. Further for the sake of simplicity a geometric form of the container is selected from the group of rectangular, triangular, circular and oval. For assisting in the determination of the geometric form of the container the segmentation mask available from the segmenting of the non-food items 30 can be used. A selection of algorithms aids the recognition of the geometric form.

In the particular example, a convex hull is extracted from the segmentation mask from the foreground pixels by using a convex hull algorithm, such as the Graham scan (Graham, R. L., An Efficient Algorithm for Determining the Convex Hull of a Finite Planar Set, Information Processing Letters, 1:132-133, 1972).

The convex hull is used as an input into a Ramer-Douglas-Peucker algorithm (Ramer, U., An iterative procedure for the polygonal approximation of plane curves, Computer Graphics and image Processing, 1(3), 244-256, 1972). With this algorithm a polygon approximation of the convex hull is obtained. From the number of line segments in the polygon approximation a first selection of container form can be performed whereby three line segments indicate a triangle, four line segments either rectangular or quadratic and all others containing none or more line angles providing a pre-selection for circular or oval container shape. Following from this, if the length of all four polygon lines segments are equal, the form is assumed to be quadratic, otherwise rectangular. For circular or oval container shapes a matrix is created by stacking all two-dimensional points which connect to polygon line segments together horizontally as matrix columns and perform a principal component analysis on a resulting covariance matrix to get to eigenvalues. The eigenvalues have more or less the same value, the geometric form of the container is defined as circular, otherwise it is defined as oval.

The use of bounding boxes is depicted in FIG. 3, where a cross section of the container can be determined.

FIG. 3 shows a sample image (food items are not displayed for simplicity) with two non-food items 202.1, 202.2 analyzed by means of respective bounding boxes 213.1, 213.2. A first plate 202.1 is approximated by a first bounding box 213.1 whereby the first plate has a rectangular shape and a cross section is calculated by drawing lines from the center towards the bounding box 213.1 of the first plate 202.1. The same is done for the second plate 202.2, which is a round dish. The actual container shape is then calculated by exploiting symmetry of the inferred container shape. For this end, the line segments as described above, corresponding to the bounding boxes are interpolated from half cross-sections of the bounding boxes starting at the center points M and approximated and rotated depending on the previously identified container shape, round, oval, quadratic or rectangular. This interpolation of the cross-section lines results in the actual container shape.

With respect to FIG. 1, the container shape is available from the container shape identification 100, and the segmentation of the food and non-food items 30, 60 and the three-dimensional model 40 are available to define a ground plane 50, and therefore, the food and/or drink volume can be calculated 90. This can be done in the present example by using the three-dimensional segmentation of the respective item and its exact position within the container, as well as the cross-section determined above. The segmented three-dimensional point-cloud can be converted into a watertight surface by a respective algorithm, such that a watertight mesh of the selected three-dimensional points is received. The inferred container shape above is then mapped onto the ground plane.

FIG. 4 shows how an identified ground plane 214 is used in conjunction with the container cross-section identified above to determine an actual container shape 202.1. Therefrom a total volume of the food and drink items is calculated. When the food item is in a container, the ground plane is shifted upwards by 8 mm to account for the thickness of the container (8 mm is the assumed average container thickness).

The watertight mesh is a triangle mesh of a plurality of polygons that are triangles. In the context of the present invention, a watertight mesh shall be understood as a mesh of polygons with no holes in it.

After the volume has been determined 90 data respective of the food and drink item is used to calculate 110 the qualitative and/or quantitative information on at least one nutrient content and/or value of the food and/or drink item. The recognition can be based on a neural network trained on labeled food and drink images. In a possible implementation of the present invention, a feedback loop can be included, which prompts a user to manually correct the automatically proposed food identification and store the corrective food information for training purposes of a neural network.

Nutritional information and values can be stored in a database. Once the method has successfully identified a particular food and/or drink item, the corresponding nutrition facts are looked up in the database. Even if an item is not available in the database, the method of the present invention can estimate a nutritional value. In the present example, nutrition facts may be derivable from database entries relating to food item volume and/or weight. Nutrition facts can be calculated to either come per 100 g or per 100 ml. The indication of the values per 100 g and/or per 100 ml can be aided by the neural network having been trained by machine learning processes to predict density of food items using previously calculated volumes. It is evident to the skilled artisan, that the nutrition facts can be calculated in other units as per 100 g, or per 100 ml. Commonly nutrition facts are presented on a "per serving" basis, where the nutrition facts are presented on the basis of a comparative value. Servings on a per cup, per ounce, or per spoon basis are frequently used in the art and easily realizable by the skilled artisan.

In an alternative example, where the device is adapted at providing a spectroscopic image, the spectrum can be measured by the optical sensor and nutritional facts can be determined based on the reflected light spectrum aided by a machine learning-based model without requiring a separate database.

The output to the user 120 can take many different forms. In its most basic embodiment, a graphical image or value is displayed on a screen depicting a glycemic index or a calorie or nutrient value for the analyzed food item. More complex content can be realized with the present invention upon discretion of the skilled artisan and dependent on the information stored in databases as well as dependent on the progress of the neural networks applied for identifying and calculating the nutritional values of the food items.

FIG. 2a shows an exemplary arrangement comprising a food item according to the present invention.

FIG. 2a shows an arrangement 201 of comprising a plurality of food items 205, 206, 207, 208, 209, 210, 211. The food items 205, 206, 207, 208, 209, 210, 211 are placed on three non-food items 202, 203, 204. The non-food items 202, 203, 204 are two plates 202, 203 and a bowl 204. The scale is predicted by means described above, or, alternatively, a reference is used.

An application of the present invention following the exemplarily described method above would be started by capturing an image 201', shown in FIG. 2b, of the arrangement, by means of an optical sensor 2 of a camera 1 preferably taken in an angle A of essentially 90 degrees with respect to the plane with the arrangement.

The image 201' is then processed by a means for analyzing the image implemented at least in part in a processor of a smartphone device. The device comprises a connection unit to establish a communication connection with a network, in the present example with a neural network accessing a database and trained at providing a first segmentation of the food items on the image 201' and a second segmentation of the non-food items 202, 203, 204. In the particular case where a detectable scale reference is used, the said is identified on the image 201'. A ground plane is determined. From the information available on the picture, height, depth and volume of the non-food items is determined and an identification and volume calculation of the food items is made possible.

With this information a detailed output can be provided with nutritional information for each of the food items on the image 201'.

The invention claimed is:

1. A method of operating a device with an output for displaying at least one quantitative and/or qualitative information on at least one nutrient content and/or value of a food item, wherein the method comprises the steps of:
    Acquiring at least one image of an arrangement comprising a food item;
    Providing a first segmentation of the at least one image for dividing the arrangement into of a plurality of separately identifiable food items;
    Identifying of at least one information for scaling the image of an arrangement comprising a food item in respect its real-world scale;
    Constructing a virtual model reflective of the arrangement comprising a food item, and
    providing a second segmentation of the at least one image for dividing the arrangement into one or more identifiable non-food items,
    wherein the first segmentation and/or the second segmentation comprises a step of inputting at least one RGB or RGB-D image to a segmentation unit aided by a neural network and receiving a segmentation mask with corresponding bounding boxes.

2. The method according to claim 1, comprising the step of calculating a volume of each separately identifiable food item, and calculating a volume of each one or more identifiable non-food item(s) and providing at least one quantitative and/or qualitative information on at least one nutrient content and/or value of the food item(s).

3. The method according to claim 2, wherein the step of constructing a virtual model comprises the generation of a three-dimensional model from the two-dimensional image of an arrangement comprising a food item.

4. The method according to claim 2, wherein the acquiring at least one image of an arrangement comprising a food item comprises acquiring at least two images of the arrangement comprising a food item from two different angles.

5. The method according to claim 1, wherein the step of constructing a virtual model comprises the generation of a three-dimensional model from the two-dimensional image of an arrangement comprising a food item.

6. The method according to claim 5, wherein the step of constructing a virtual model comprises a deprojection of the two-dimensional image of the arrangement comprising the food item.

7. The method according to claim 5, wherein the acquiring at least one image of an arrangement comprising a food item comprises acquiring at least two images of the arrangement comprising a food item from two different angles.

8. The method according to claim 1, wherein the acquiring at least one image of an arrangement comprising a food item comprises acquiring at least two images of the arrangement comprising a food item from two different angles.

9. The method according to claim 1, wherein in a first step of the second segmentation
    a. a container shape is identified, and
    b. a container diameter and/or cross-section is determined by means of derivation from the segmentation mask with corresponding bounding boxes.

10. A non-transitory computer program product, containing instructions stored therein that, when operated on a device with an output for displaying at least one quantitative and/or qualitative information on at least one nutrient content and/or value of a food item causes the device to perform the method according to claim 1.

11. The method according to claim 1, wherein in a first step of the second segmentation
    a. a container shape is identified from a group of predetermined container shapes consisting of: rectangular container shape, triangular container shape, circular container shape and oval container shape, and
    b. a container diameter and/or cross-section is determined by means of derivation from the segmentation mask with corresponding bounding boxes.

* * * * *